(12) United States Patent
Kunert et al.

(10) Patent No.: US 9,120,258 B2
(45) Date of Patent: Sep. 1, 2015

(54) DEVICE FOR ENCAPSULATING A COMPONENT WITH PLASTICS MATERIAL

(75) Inventors: Peter Kunert, Lichtenstein (DE); Christian Ohl, Pfullingen (DE); Matthias Waibler, Remshalden-Hebsack (DE); Matthias Ludwig, Moessingen (DE); Andreas Blum, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/123,432

(22) PCT Filed: May 24, 2012

(86) PCT No.: PCT/EP2012/059652
§ 371 (c)(1),
(2), (4) Date: Dec. 2, 2013

(87) PCT Pub. No.: WO2012/163775
PCT Pub. Date: Dec. 6, 2012

(65) Prior Publication Data
US 2014/0093601 A1    Apr. 3, 2014

(30) Foreign Application Priority Data

May 31, 2011 (DE) .......................... 10 2011 076 747
May 31, 2011 (DE) ..................... 20 2011 103 625 U

(51) Int. Cl.
*B29C 45/14*    (2006.01)
(52) U.S. Cl.
CPC ..... *B29C 45/14065* (2013.01); *B29C 45/14073* (2013.01); *B29C 45/14639* (2013.01)
(58) Field of Classification Search
CPC .............. B29C 45/14073; B29C 45/14778; B29C 45/14836; A45D 34/02; A45D 2034/007; B29K 2709/08

USPC .......................................... 425/567; 264/259
See application file for complete search history.

(56) References Cited

U.S. PATENT DOCUMENTS 3,311,690 A * 3/1967 Fischer .................... 264/278
5,827,440 A 10/1998 Furuya et al.
2006/0202388 A1 9/2006 Dieudonat et al.

FOREIGN PATENT DOCUMENTS

| CN | 2004291269 | 10/2004 |
|---|---|---|
| DE | 102004044864 | 8/2005 |
| DE | 102004050141 | 4/2006 |
| DE | 102007036264 | 2/2009 |
| DE | 19620002 | 7/2010 |

OTHER PUBLICATIONS

International Search Report for Application No. PCT/EP2012/059652 dated Sep. 24, 2013 (4 pages).

* cited by examiner

*Primary Examiner* — Jacob Thomas Minskey
(74) *Attorney, Agent, or Firm* — Michael Best & Friedrich LLP

(57) ABSTRACT

The invention relates to a device (10; 10*a*) for encapsulating a component (1) with plastic material (2), comprising at least two tool parts (11, 12), which in a closed arrangement for encapsulating the component (1) form a receptacle (15) for the component (1), an injection channel (30) for supplying the liquefied plastic material (2) to the region of the receptacle (15), and a single retaining element (22) for positioning the component (1) in the receptacle (15), wherein the retaining element (22) can be moved in a first position for positioning the component (1) in the receptacle (15) and in a second position for preferably completely encapsulating the component (1) with the plastic material (2). According to the invention, the retaining element (22) holds the component (1) in the region of the receptacle (15) by means of form positive and/or clamping engagement.

17 Claims, 4 Drawing Sheets

DEVICE FOR ENCAPSULATING A COMPONENT WITH PLASTICS MATERIAL

BACKGROUND OF THE INVENTION

The invention relates to a device for encapsulating a component with plastics material.

Such a device is known from DE 10 2007 036 264 A1. The known device has a tool consisting of two tool halves, which are movable with respect to one another, and in the closed state form a receptacle for the encapsulation of a component. In one tool half there is formed a through-opening, in which a slide is arranged in a longitudinally movable manner, serving for positioning the component to be encapsulated. In the previously known document, the component to be encapsulated is an element of a permanent magnet, so that it can be positioned merely by being placed on the planar surface of the pin-shaped holding element consisting of metal. As soon as the component to be encapsulated is encapsulated in certain regions and the plastics material has set, the holding element can be retracted in its through-bore, after which the not yet encapsulated region of the component can then be encapsulated with plastics material in a second encapsulating step. The positioning of a component to be encapsulated by means of a single holding element is problematic if this element is not for example positioned by magnetic action, as in the previously known document.

Therefore, DE 196 20 002 B4 discloses a further device for encapsulating a component in which four holding pins are provided for positioning the component to be encapsulated and can be brought up against the component from two sides by being inserted into recesses in the component. However, such a device equipped with multiple holding elements is of a relatively complex construction, since the holding elements have to be movably arranged. In addition, the use of multiple holding elements is possibly restricted by the geometry of the component to be encapsulated, or multiple steps are required for encapsulating the component until it is completely encapsulated.

SUMMARY OF THE INVENTION

Against the background of the prior art presented, the invention is based on the object of developing a device for encapsulating a component with plastics material in such a way that, with a device that is of the simplest possible construction, secure positioning of the component to be encapsulated in the receptacle of the device is made possible. This object is achieved according to the invention in the case of a device for encapsulating a component with plastics material by the holding element (slide pin) holding the component in the region of the receptacle by interlocking or clamping engagement. In other words, this means that the component is arranged in operative connection with the holding element in such a way that secure holding or positioning of the component in the receptacle is made possible by the shaping of the (single) holding element alone.

In a particularly preferred structural configuration of the single holding element, it is proposed that the holding element has on the side facing the component a receiving region for encapsulating certain regions of the component. For example, the holding element may be formed for this purpose in a sleeve-shaped manner, while the component has a pin-shaped continuation, which protrudes into the sleeve-shaped receiving region. Appropriate dimensioning of the diameters of the receiving region and of the continuation on the component then allows the required clamping or interlocking engagement to be achieved.

In a further configuration, which makes a particularly compact construction of the tool and particularly good guidance of the holding element possible, it is proposed that the holding element is enclosed at least in certain regions by a tubular element (nozzle needle) serving for the inflow of the liquid plastics material into the receptacle.

The construction of the tool can be additionally made particularly simple if the holding element and the tubular element are arranged in one tool half, the tool half having at least one feeding region for the plastics material, in which the holding element and the tubular element are partially arranged. This allows the other tool half to be kept free of additional guides for the holding element or the tubular element for influencing the inflow of the liquid plastics material, so that it can be formed in a particularly simple manner.

A further structurally advantageous configuration concerns the region in which the liquefied plastics material enters the receptacle of the tool. It is proposed here that the injection channel is formed in one tool half, between the tubular element and the other tool half, the opening cross section of the injection channel being controllable by means of the position of the tubular element, and the plastics material flowing radially around the element in the region of the injection channel.

Most particularly preferred in this respect is a form of the tubular element in which it has on its outer wall a portion of reduced diameter for closing and opening the injection channel, it being particularly preferred for the portion to be formed as an annular groove. Such a form of the element brings about in particular a particularly good flow of the plastics material around the component to be encapsulated and, in addition, reduced loading of the connection between the holding element and the component, since the radial flow around the component does not allow the liquid plastics material to impinge directly on the end face of the component and thereby exert a releasing force on the connection.

BRIEF DESCRIPTION OF THE DRAWINGS

Further advantages, features and details of the invention emerge from the following description of preferred exemplary embodiments and on the basis of the drawing, in which.

The same components or components with the same function are provided with the same reference numerals in the figures.

DETAILED DESCRIPTION

Figure 1:
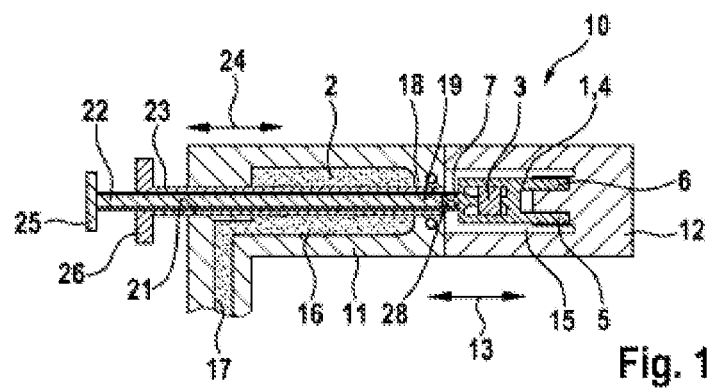
FIGS. 1 to 5 show a first device according to the invention for encapsulating a component with plastics material during various phases of the encapsulation in respectively simplified longitudinal sections.

In FIGS. 1 to 5, a first device 10 according to the invention for encapsulating a component 1 with plastics material 2 is represented. The component 1 is, for example, but not in a restrictive sense, a sensor 4, which has an electronic circuit 3 and can by way of example be electrically contacted by means of two electrical terminal lugs 5, 6. It is intended here for the sensor 4 to be encapsulated with the plastics material 2 with the exception of in the region of the terminal lugs 5, 6.

The device 10 has two tool halves 11, 12, which are movable with respect to one another in the direction of the double-headed arrow 13 by means of a drive that is not represented. A fundamental distinction is drawn here between two positions of the two tool halves 11, 12: in one position, represented in FIG. 5, the sensor 4 can be introduced into the device 10 before the encapsulation and removed from the device 10 after the encapsulation, while in the closed position of the two tool halves 11, 12, represented in FIGS. 1 to 4, there is formed a receptacle 15, which can be filled with the injected plastics material 2 for encapsulating the sensor 4 and for forming the outer contour of the encapsulated sensor 4.

The one tool half 11 is for example formed in an L-shaped manner in longitudinal section, with a substantially annularly formed first feeding region 16 for liquefied plastics material 2 and a second feeding region 17, which is arranged at right angles to the feeding region 16 and via which the liquefied plastics material 2 passes into the first feeding region 16. The first feeding region 16 or the tool half 11 has on the side facing the tool half 12 a wall portion 18 that is withdrawn in the form of a flange and has a through-opening 19. In line with the through-opening 19, a further through-opening 21 is formed on the side of the first feeding region 16 that is facing away from the wall portion 18. The two through-openings 19, 21 serve for guiding a slide pin 22, formed as a holding element, and a nozzle needle 23, which are arranged coaxially in relation to one another, and which are movable independently of one another in the direction of the double-headed arrow 24, for example by means of actuating flanges 25, 26 arranged outside the tool half 11. Here, at least the nozzle needle 23 is guided in the further through-opening 21 such that it is sealed at its outer circumference.

The two actuating flanges 25, 26 are preferably coupled to drives that are not represented, which make a controlled movement of the nozzle needle 23 and of the slide pin 22 possible.

The slide pin 22 has on the side facing away from the actuating flange 25 a holding receptacle 28, which in the exemplary embodiment represented is formed as a cylindrical holding receptacle 28. The holding receptacle 28 interacts with a pin-shaped continuation 7, which is formed on the component 1 on the side facing the holding receptacle 28, for the positioning and holding of the component 1 in the receptacle 15. It is essential here that the dimensioning of the continuation 7 and of the holding receptacle 28 are made to match one another in such a way that, for the holding or positioning of the component 1 during the encapsulation of the component 1 with plastics material 2, an interlocking or clamping engagement is established between the holding receptacle 28 and the continuation 7 or the component 1, making it possible for the component 1 to be held or positioned in the receptacle 15 during the encapsulation of the component 1 with liquid plastics material 2.

It is additionally mentioned that the form of the holding receptacle 28 and of the continuation 7 is intended to be represented merely by way of example and the respective form thereof must be adapted to the respective component 1 or the application in such a way that an interlocking or clamping engagement is established between the holding receptacle 28 and the continuation 7.

Figure 2:
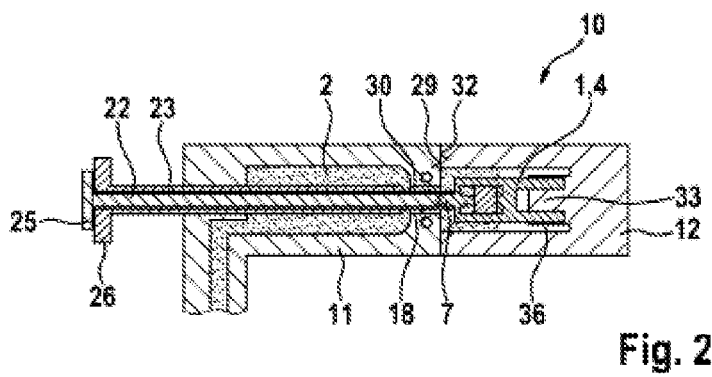
Figure 3:
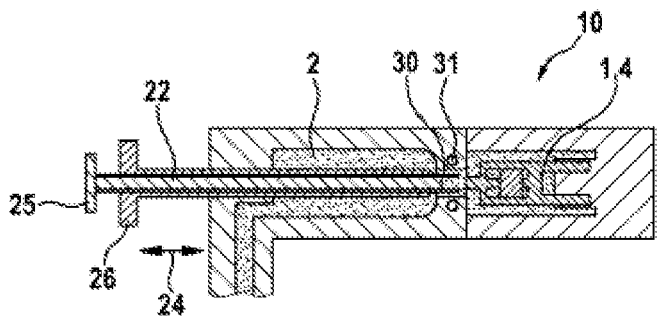
Figure 4:
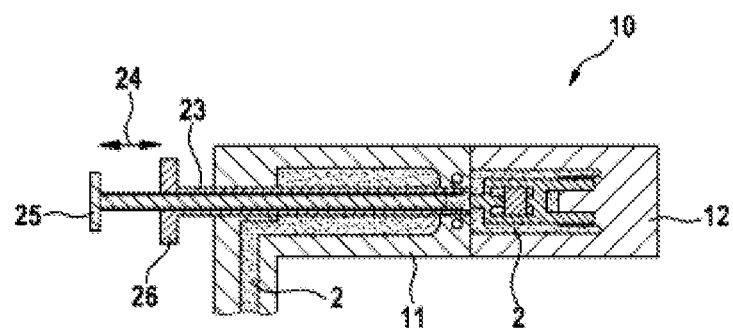

The sliding pin 22 is arranged such that it is substantially adjustable between two positions within the tool half 11: in the position represented in FIGS. 1 and 2, the holding receptacle 28 protrudes into the tool half 12 or the receptacle 15 and securely holds the component 1 in the position intended for it within the receptacle 15. On the other hand, the slide pin 22 is in a position located in the region of the through-opening 19 for the complete encapsulation of the component 1 with the plastics material 2, as is represented in FIGS. 3 and 4.

The nozzle needle 23 is formed in a substantially tubular manner and encloses the slide pin 22 at the outer circumference thereof almost without any gap, in such a way that the slide pin 22 is longitudinally displaceable in relation to the nozzle needle 23. The nozzle needle 23 also has substantially two positions: in the one position, represented in FIGS. 1 and 4, the side of the nozzle needle 23 facing away from the actuating flange 26 finishes flush with the outer end face 29 of the wall portion 18. On the other hand, the nozzle needle 23 is in a position retracted into the first feeding region 16 for delivering the liquefied plastics material 2 via an annular channel 30 formed between the slide pin 22 and the through-bore 19, as is represented in FIGS. 2 and 3.

It may preferably be provided that the tool half 11 has in the region of the wall portion 18 a heating device 31, for example in the form of a heating wire, surrounding the through-opening 19 at a small distance, in order that it is ensured that the plastics material 2 is in the liquefied state when it is injected into the receptacle 15.

The second tool half 12 is formed in a substantially pot-shaped manner, in such a way that, in the position of the tool half 12 arranged in operative connection with the tool half 11, the annular end face 32 thereof finishes flush with the end face 29 of the tool half 11. On the side facing away from the end face 32, the tool half 12 has in its interior a pin-shaped continuation 33 with two receiving openings 34, 35, which serve for receiving the two terminal lugs 5, 6 of the component 1 in a sealing manner. In this case, the form of the receiving openings 34, 35 is, however, such that they do not serve for the positioning of the component 1 in the receptacle 15, but merely for the sealing of the terminal lugs 5, 6, in order that they are not encapsulated by the plastics material 2. Between the continuation 33 and the inner wall of the tool half 12, the receptacle 15 forms an annular subregion 36.

The device 10 described thus far for encapsulating the component 1 with plastics material 2 operates as follows: in the position of the device 10 represented in FIG. 1, the component 1 has already been positioned in advance with its terminal lugs 5, 6 in the receiving openings 34, 35 of the tool half 12 and the slide pin 22 has been brought with its holding receptacle 28 into operative connection with the continuation 7 of the component 1. Furthermore, the tool half 12 is in its position moved up against the tool half 11, in such a way that the outwardly sealed receptacle 15 is formed by the end face 32 of the tool half 11 and the interior space of the tool half 12. In the position represented in FIG. 1, it is already preferably provided that liquefied or heated plastics material 2 is in the feeding regions 16, 17 of the tool half 11. For this purpose, the nozzle needle 23 is in its position closing the through-opening 19 or the channel 30, in order initially to prevent injection of plastics material 2 into the receptacle 15.

Subsequently, in a way corresponding to FIG. 2, the nozzle needle 23 is moved into its position retracted into the receptacle 15, in such a way that plastics material 2 can pass via the annular channel 30 into the receptacle 15. As soon as the receptacle 15 is completely filled with plastics material 2, the nozzle needle 23 is moved back into its position protruding into the receptacle 15 or the through-opening 19, so that the region of the continuation 7 can also be encapsulated with the plastics material 2. Subsequently, in a way corresponding to FIG. 4, the nozzle needle 23 is moved again into its position closing the annular channel 30, in order that the receptacle 15 is separated from the first feeding region 16, so that the plastics material 2 enclosing the component 1 in the receptacle 15 can cool down.

Figure 5:
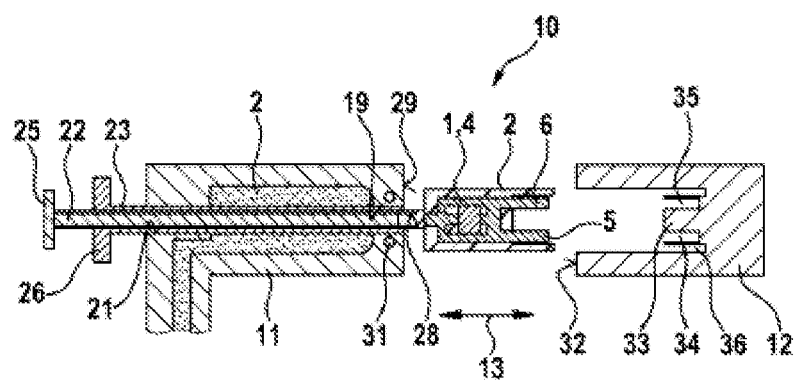
Figure 6:
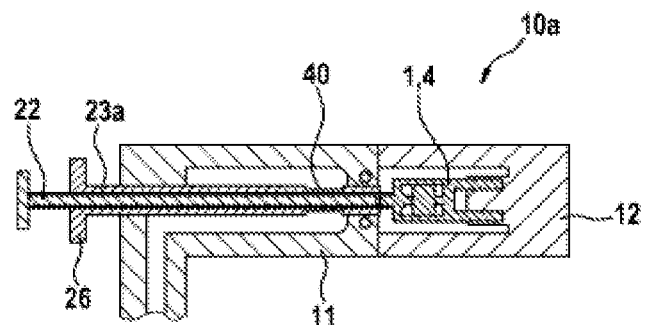
FIGS. 6 to 10 show a device modified with respect to FIGS. 1 to 5, likewise during various phases of the encapsulation of a component in simplified longitudinal sections
Figure 7:
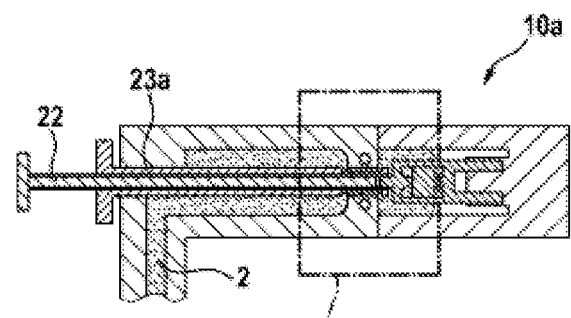
Figure 8:
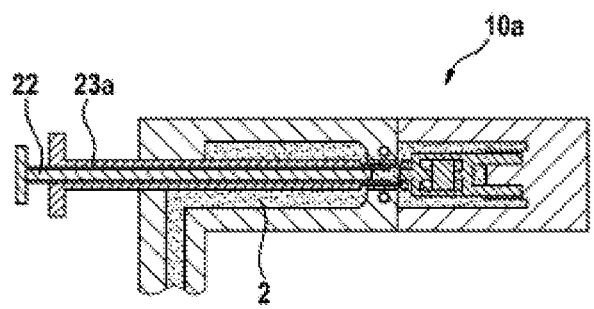
Figure 9:
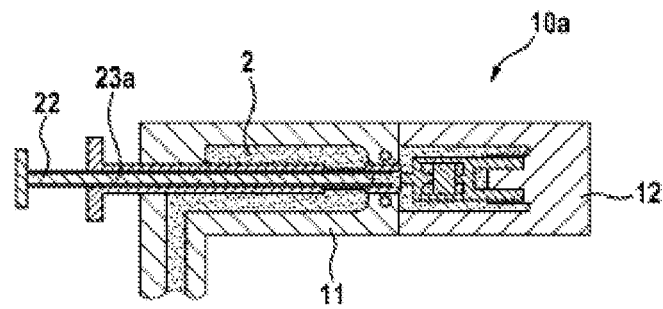
Figure 10:
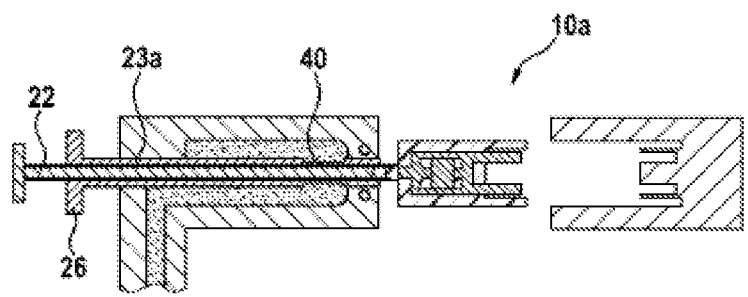
Figure 11:
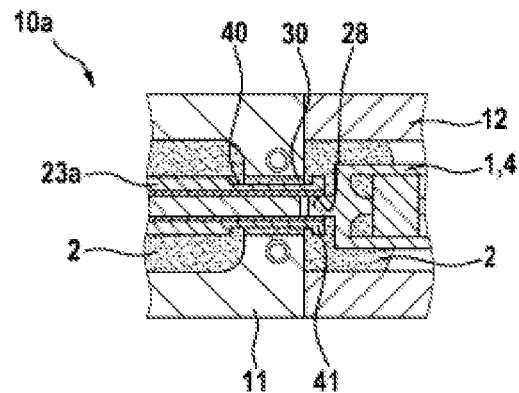
FIG. 11 shows a detail of FIG. 7 in an enlarged representation.

Finally, in a way corresponding to FIG. 5, the tool half 12 is moved away from the tool half 11, so that the component 1 encapsulated with plastics material 2 can be demolded or removed from the tool half 12.

In FIGS. 6 to 11, a second device 10a according to the invention is represented. The device 10a differs from the device 10 by the form of the nozzle needle 23a. Here, the nozzle needle 23a has on the side facing away from the actuating flange 26 a portion of reduced diameter in the form of a radially peripheral annular groove 40. As can be seen in particular from FIG. 11, by contrast with the device 10, for injecting the plastics material 2 into the receptacle 15, the nozzle needle 23a is moved into a position in which the annular groove 40 is in the region of the annular channel 30, in such a way that the end 41 of the nozzle needle 23a is positioned axially in relation to the component 1 such that plastics material 2 flowing via the remaining annular channel 30 between the nozzle needle 23a and the through-opening 19 into the receptacle 15 is deflected radially outward in such a way that it does not impinge directly on the end face 8 of the component 1 and cannot produce a force there on the component 1 that releases it from the holding receptacle 28.

The devices 10, 10a described thus far can be changed or modified in various ways without departing from the concept of the invention. It is conceivable in particular that the device 10, 10a consists of more than two tool halves 11, 12. In addition, it is also conceivable that components 1 that do not have terminal lugs 5, 6 are encapsulated with plastics material 2. It may also be provided that, before the retraction of the slide pin 22 from the component 1 in a way corresponding to FIG. 4, the plastics material 2 located in the receptacle 15 has partially set, in order to ensure when the slide pin 22 is retracted that the slide pin 22 comes away from the component 1 without the component 1 being displaced from its position in the receptacle 15.

The invention claimed is:

1. A device (10; 10a) for encapsulating a component (1) with plastics material (2), the device having at least first and second tool halves (11, 12), which in a closed arrangement for encapsulating the component (1) form a receptacle (15) for the component (1), having an injection channel (30) for feeding liquefied plastics material (2) into a region of the receptacle (15) and having a single holding element (22) for positioning the component (1) in the receptacle (15), the holding element (22) being movable into a first position, for positioning the component (1) in the receptacle (15), and into a second position, for completely encapsulating the component (1) with the plastics material (2), characterized in that the holding element (22) holds the component (1) in the region of the receptacle (15) by interlocking or clamping engagement, wherein the holding element (22) has on a side facing the component (1) a receiving region (28) for enclosing the component (1) in certain regions, wherein the holding element (22) is formed in a substantially pin-shaped manner, wherein the holding element (22) is radially surrounded, at least in certain regions, by a tubular element (23; 23a) serving for controlling the flow of the plastics material (2) into the receptacle (15), and wherein the tubular element (23; 23a) is movably arranged coaxially in relation to the holding element (22).

2. The device as claimed in claim 1, characterized in that the holding element (22) and the tubular element (23; 23a) are arranged in the first tool half (11), the first tool half (11) having at least one feeding region (16, 17) for the plastics material (2), in which the holding element (22) and the element (23; 23a) are partially arranged.

3. The device as claimed in claim 2, characterized in that from the at least one feeding region (16, 17) there respectively protrude in a sealed manner an actuating portion (25, 26) for controlling the movement of the holding element (22) and of the tubular element (23; 23a).

4. The device as claimed in claim 2, characterized in that the injection channel (30) is formed in the first tool half (11), between the tubular element (23; 23a) and the second tool half (12), an opening cross section of the injection channel (30) being controllable by means of the position of the tubular element (23; 23a), and the plastics material (2) flowing radially around the tubular element (23; 23a) in a region of the injection channel (30).

5. The device as claimed in claim 4, characterized in that the tubular element (23a) has on an outer wall a portion of reduced diameter for closing and opening the injection channel (30).

6. The device as claimed in claim 5, characterized in that the portion is formed as an annular groove (40).

7. The device as claimed in claim 1, wherein the receiving region (28) includes a holding receptacle.

8. The device as claimed in claim 7, wherein the holding receptacle is sleeve-shaped and is configured to receive a pin-shaped portion of the component.

9. A device (10; 10a) for encapsulating a component (1) with plastics material (2), the device having at least first and second tool halves (11, 12), which in a closed arrangement for encapsulating the component (1) form a receptacle (15) for the component (1), having an injection channel (30) for feeding liquefied plastics material (2) into a region of the receptacle (15) and having a single holding element (22) for positioning the component (1) in the receptacle (15), the holding element (22) being movable into a first position, for positioning the component (1) in the receptacle (15), and into a second position, for completely encapsulating the component (1) with the plastics material (2), characterized in that the holding element (22) holds the component (1) in the region of the receptacle (15) by interlocking or clamping engagement, wherein the holding element (22) is formed in a substantially pin-shaped manner, wherein the holding element (22) is radially surrounded, at least in certain regions, by a tubular element (23; 23a) serving for controlling the flow of the plastics material (2) into the receptacle (15), wherein the tubular element (23; 23a) is movably arranged coaxially in relation to the holding element (22), and wherein the holding element (22) and the tubular element (23; 23a) are arranged in the first tool half (11), the first tool half (11) having at least one feeding region (16, 17) for the plastics material (2), in which the holding element (22) and the element (23; 23a) are partially arranged.

10. The device as claimed in claim 9, characterized in that the holding element (22) has on a side facing the component (1) a receiving region (28) for enclosing the component (1) in certain regions.

11. The device as claimed in claim 10, wherein the receiving region (28) includes a holding receptacle.

12. The device as claimed in claim 11, wherein the holding receptacle is sleeve-shaped and is configured to receive a pin-shaped portion of the component.

13. The device as claimed in claim 9, characterized in that from the at least one feeding region (16, 17) there respectively protrude in a sealed manner an actuating portion (25, 26) for controlling the movement of the holding element (22) and of the tubular element (23; 23a).

14. The device as claimed in claim 9, characterized in that the injection channel (30) is formed in the first tool half (11), between the tubular element (23; 23a) and the second tool half (12), an opening cross section of the injection channel (30) being controllable by means of the position of the tubular element (23; 23*a*), and the plastics material (2) flowing radially around the tubular element (23; 23*a*) in a region of the injection channel (30).

15. The device as claimed in claim 14, characterized in that the tubular element (23*a*) has on an outer wall a portion of reduced diameter for closing and opening the injection channel (30).

16. The device as claimed in claim 15, characterized in that the portion is formed as an annular groove (40).

17. A device (10; 10*a*) for encapsulating a component (1) with plastics material (2), having at least a first tool half (11) and a second tool half (12), which in a closed arrangement for encapsulating the component (1) form a receptacle (15) for the component (1), having an injection channel (30) for feeding the liquefied plastics material (2) into a region of the receptacle (15) and having a single holding element (22) for positioning the component (1) in the receptacle (15), wherein the holding element (22) holds the component (1) in the region of the receptacle (15) by interlocking or clamping engagement, the holding element (22) being movable into a first position, for positioning the component (1) in the receptacle (15), and into a second position, for completely encapsulating the component (1) with the plastics material (2), the holding element (22) being formed in a substantially pin-shaped manner and being radially surrounded, at least in certain regions, by a tubular element (23; 23*a*), the tubular element (23; 23*a*) being movably arranged coaxially in relation to the holding element (22), wherein the holding element (22) and the tubular element (23; 23*a*) are arranged in the first tool half (11), the first tool half (11) having at least one feeding region (16, 17) for the plastics material (2) and the injection channel (30) being formed between the tubular element (23; 23*a*) and the first tool half (11), an opening cross section of the injection channel (30) being controllable by means of the position of the tubular element (23; 23*a*) for controlling the inflow of the plastics material (2) into the receptacle (15), and the plastics material (2) flowing radially around the tubular element (23; 23*a*) in a region of the injection channel (30).

\* \* \* \* \*